United States Patent
Takahashi et al.

(10) Patent No.: US 6,505,970 B2
(45) Date of Patent: Jan. 14, 2003

(54) THRUST DYNAMIC PRESSURE BEARING

(75) Inventors: Takeshi Takahashi, Kashiba (JP); Takeharu Ogimoto, Nara-ken (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 4 days.

(21) Appl. No.: 09/777,794

(22) Filed: Feb. 6, 2001

(65) Prior Publication Data

US 2001/0022870 A1 Sep. 20, 2001

(30) Foreign Application Priority Data

Mar. 10, 2000 (JP) ........................................ 2000-066234

(51) Int. Cl.[7] ............................................... F16C 32/06
(52) U.S. Cl. ........................ 384/123; 303/107; 303/112
(58) Field of Search ................................. 384/123, 112, 384/121, 113, 107

(56) References Cited

U.S. PATENT DOCUMENTS

| | | | | |
|---|---|---|---|---|
| 4,685,813 A | * | 8/1987 | Moog | 384/118 |
| 5,381,456 A | * | 1/1995 | Vetter et al. | 378/132 |
| 5,956,204 A | * | 9/1999 | Dunfield et al. | 184/6.25 |
| 5,988,886 A | * | 11/1999 | Takahashi | 384/107 |
| 6,034,454 A | * | 3/2000 | Ichiyama | 310/90 |
| 6,250,807 B1 | * | 6/2001 | Mori et al. | 384/100 |
| 6,350,059 B1 | * | 2/2002 | Takahashi | 384/123 |
| 6,357,916 B2 | * | 3/2002 | Saeki et al. | 310/90 |
| 6,361,216 B1 | * | 3/2002 | Takahashi et al. | 384/107 |

FOREIGN PATENT DOCUMENTS

| | | | | |
|---|---|---|---|---|
| JP | 2278007 | * | 11/1990 | ............ 384/107 |
| JP | 7-243438 | | 9/1995 | |
| JP | 10-196643 | | 7/1998 | |
| JP | 10196643 | * | 7/1998 | ............ 384/107 |

* cited by examiner

*Primary Examiner*—Christopher P. Schwartz
*Assistant Examiner*—Devon Kramer
(74) *Attorney, Agent, or Firm*—Jordan and Hamburg LLP

(57) ABSTRACT

It is an object of the invention to provide a thrust dynamic pressure bearing in which complex small holes or the like are not disposed so that the production cost is not increased, and negative-pressure suction which may be caused at start of rotation is prevented from occurring, thereby enabling the bearing to correctly function as a thrust dynamic pressure bearing.

In solving means for the above, a rotor 1 in which thrust dynamic pressure generating grooves are formed in an end face, and a housing 2 which accommodates the rotor 1 in a hermetically sealed state with forming small gaps 3 and 4 therebetween are disposed. The gaps are filled with a working fluid L for generating a dynamic pressure. Pockets (1p, 2P) which serve as spaces for accumulating the working fluid are formed in the end face 1a of the rotor 1 and an end face 2a of the housing 2 that is opposed to the end face 1a, respectively. A total of capacities of the pockets is 50 times or more the capacity of the bearing gap 3 between the end face of the rotor 1 and the end face of the housing 2. Furthermore, the bearing gap 3 is inclinedly reduced as moving toward a radially outer side.

6 Claims, 8 Drawing Sheets

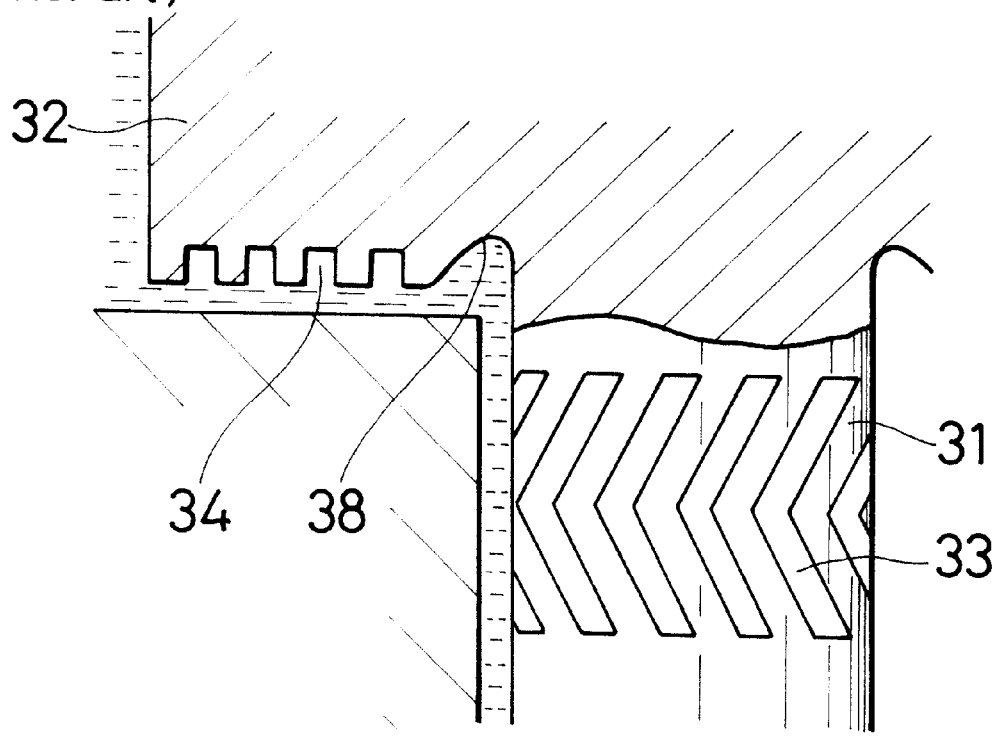

THRUST DYNAMIC PRESSURE BEARING

BACKGROUND OF THE INVENTION

The invention relates to a thrust dynamic pressure bearing, and more particularly to a thrust dynamic pressure bearing in which negative-pressure suction of a working fluid is prevented from occurring at start of rotation of a sealed thrust dynamic pressure bearing.

As shown in FIGS. 8(A) and 8(B), a thrust dynamic pressure bearing of the conventional art is configured by: a rotor 30 consisting of a shaft 31, and a flange 32 which is disposed on one end of the shaft 31; and a housing 40 which accommodates the shaft 31 and the flange 32 in a hermetically sealed state. In this case, V-like or herringbone-like dynamic pressure generating grooves 33 for generating a radial dynamic pressure are formed in the surface of the shaft 31, or V-like or herringbone-like dynamic pressure generating grooves 34 for generating a thrust dynamic pressure, and the like are formed in end faces 32a and 32b of the flange 32. Small spaces 35 and 36 between the rotor 30 and the housing 40 are filled with a working fluid L for generating a dynamic pressure.

In the thus configured sealed thrust dynamic pressure bearing, at the same time when the rotor 30 is to be started, the dynamic pressure generating grooves 34 of the end faces in the axial direction which are formed in the flange 32 try to suck the working fluid L in a center portion in a radial direction. However, a negative pressure is generated between the upper and lower end faces of the flange 32, because the housing 40 accommodates the flange 32 in a hermetically sealed state, thereby producing a problem in that the working fluid cannot be sufficiently guided into a space between the receiving face of the housing 40 and the lower end face of the flange 32, particularly into a radially inner portion of the space in which the working fluid originally exists in a very small amount. Therefore, small holes 37 are opened in the root portion of the flange 32 (Japanese Patent Publication (Kokai) No. HEI10-196643).

During rotation, the working fluid is simultaneously moved into the V-like or herringbone-like dynamic pressure generating grooves 33 for generating a radial dynamic pressure which are formed in the surface of the shaft 31, and the V-like or herringbone-like dynamic pressure generating grooves 34 for generating a thrust dynamic pressure which are formed in the end faces of the flange 32, and hence a negative pressure is easily generated in the portion where the flange 32 is connected to the shaft 31. In order to prevent the working fluid which is originally small in amount from becoming insufficient, as shown in FIG. 9, a recess 38 is formed in the root portion so as to function as a portion for accumulating the working fluid. Furthermore, a structure has been proposed in which, in place of the recess 38, oblique small holes for circulating a working fluid are formed between the upper or lower end of the flange 32 and the root portion, or radial holes are formed between vertical small holes in the root portion and the end portion of the flange 32 are formed (Japanese Patent Publication (Kokai) No. HEI7-243438).

When the working fluid is insufficient in the spaces between the upper and lower faces (particularly, the lower face) of the flange 32 of the rotor 30 constituting the sealed thrust dynamic pressure bearing and the receiving face of the housing 40 as described above, the bearing cannot function as a thrust dynamic pressure bearing, and may be damaged. In order to prevent such a disadvantage from occurring, it has been proposed to form the small holes 37 for guiding the working fluid to the flange 32 in the vicinity of the shaft as described above. However, this produces problems in that the process of correctly forming the small holes 37 is difficult to perform and increases the production cost, and that a space for forming the small holes is required. Moreover, the bearing area is increased, and hence there arises a problem in that a torque loss is produced. Even when the recess 38 for the working fluid is disposed in the portion where the flange 32 is connected to the shaft 31 as shown in FIG. 9, the working fluid is not sufficiently circulated, so that the tendency to an insufficient amount of the working fluid due to the negative pressure is not solved, thereby producing a problem in that there is a case where negative-pressure suction occurs to cause the thrust dynamic pressure bearing not to function.

SUMMARY OF THE INVENTION

The invention has been conducted in order to solve the problems discussed above. It is an object of the invention to provide a thrust dynamic pressure bearing in which complex small holes or the like are not disposed so that the production cost is not increased, and negative-pressure suction which may be caused at start of rotation is prevented from occurring, thereby enabling the bearing to correctly function as a thrust dynamic pressure bearing.

In order to solve the problems, the thrust dynamic pressure bearing of the invention is a thrust dynamic pressure bearing which comprises a rotor (1) and a housing (2) that accommodates the rotor (1) in a hermetically sealed state with forming small gaps (3, 4) therebetween, and in which thrust dynamic pressure generating grooves are formed in one of an end face of the rotor and a face of the housing (2) that is opposed to the end face of the rotor, and the gaps are filled with a working fluid (L) for generating a dynamic pressure, wherein pockets (1p, 2P) which serve as spaces for accumulating the working fluid are formed in the end face (1a) of the rotor (1) and the end face (2a) of the housing (2) that is opposed to the end face (1a), respectively, and a total of capacities of the pockets (1p, 2P) is 50 times or more a capacity of the bearing gap (3) between the end face of the rotor (1) and the end face of the housing (2).

An embodiment of the invention is characterized in that the bearing gap (3) between the rotor (1) and the housing (2) is inclinedly reduced as moving toward a radially outer side.

Another embodiment of the invention is characterized in that a depth of the thrust dynamic pressure generating grooves (11) is inclinedly larger as moving from a radially inner side toward a radially outer side.

Furthermore, a thrust dynamic pressure bearing of the invention of claim 4 is a thrust dynamic pressure bearing comprising: a rotation shaft (10s) in which radial dynamic pressure generating grooves are formed; and a flange (10f) in which thrust dynamic pressure generating grooves (13) are formed, a recess (16) being formed in a root portion where the flange (10f) is connected to the rotation shaft (10s), a bearing gap (14) between a rotor (10) and a housing (20) being hermetically filled with a working fluid (L), wherein the bearing gap (14) between the flange (10f) and the housing (20) is formed to be smaller as moving toward a radially outer side.

The above invention may be further characterized in that a depth of the thrust dynamic pressure generating grooves (13) is inclinedly larger as moving from a radially inner side toward the radially outer side.

BRIEF DESCRIPTION OF THE DRAWINGS

FIG. 9 is a partial section view showing an example of a conventional thrust dynamic pressure bearing in which radial dynamic pressure generating grooves are formed in the surface of a rotation shaft, and thrust dynamic pressure generating grooves are formed in a flange.

DETAILED DESCRIPTION OF THE PREFERRED EMBODIMENTS

Hereinafter, specific embodiments of the invention will be described with reference to the accompanying drawings.

Figure 1A:
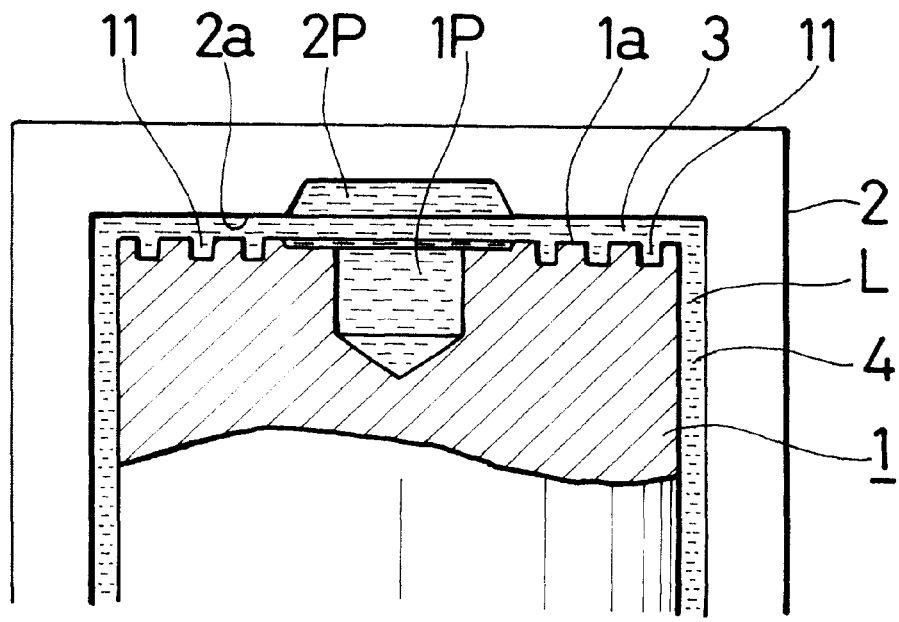
FIG. 1(A) is a partial section view of a thrust dynamic pressure bearing of a first embodiment of the invention.
Figure 1B:
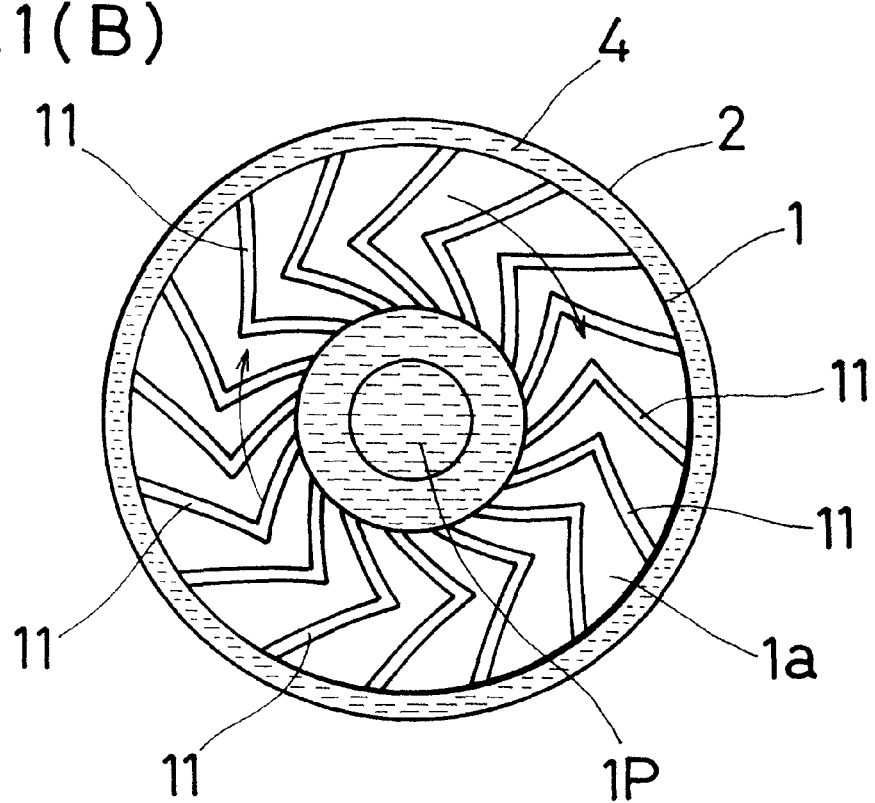
FIG. 1(B) is a section view taken along the line A—A of FIG. 1(A)

FIG. 1(A) is a partial section view of a thrust dynamic pressure bearing of a first embodiment of the invention, and FIG. 1(B) is a section view taken along the line A—A of FIG. 1(A).

This thrust dynamic pressure bearing is configured by a rotor 1 and a housing 2. The rotor 1 is accommodated in the housing 2 in a hermetically sealed state with forming small gaps 3 and 4 between the inner periphery of the housing 2 and the rotor 1. In this case, the gap 3 functions as a bearing gap. Also the gap 4 may be caused to function as a bearing gap, by forming dynamic pressure generating grooves in the side face of the rotor 1 or the housing 2. The gaps 3 and 4 are filled with a working fluid L for generating a dynamic pressure. V-like or herringbone-like thrust dynamic pressure generating grooves 11 are formed in an upper end face 1a of the rotor 1. Pockets 1P and 2P which serve as spaces for accumulating the working fluid L are disposed in the upper end face 1a of the rotor 1 and a face 2a that is opposed to the upper end face 1a, respectively.

Figure 2:
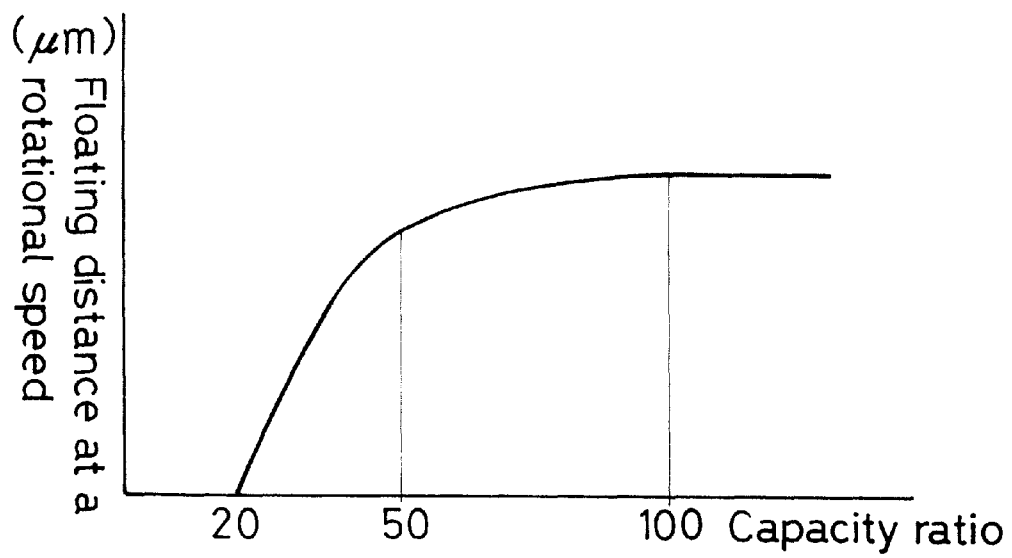
FIG. 2 is a view showing relationships between a total capacity ratio of a bearing gap and a pocket, and a floating distance at a low rotational speed (starting)

In a conventional structure of a dynamic pressure bearing, at start of rotation of the dynamic pressure bearing (i.e., at a low rotational speed), generally, the floating distance in a center portion of the rotation is very small because negative-pressure suction easily occurs, and hence it is often that the bearing does not function as a thrust dynamic pressure bearing. However, it has been found that, when the pockets 1P and 2P are disposed in addition to the capacity of the dynamic pressure bearing (the capacity of the bearing gap 3 in FIG. 1(A), negative-pressure suction does not occur and therefore a sufficient thrust dynamic pressure is generated also at a low rotational speed. According to experimental results, it has been found that, when the capacity ratio is 20 times or less, as shown in FIG. 2, a flotation force is not generated at a low rotational speed, but the flotation force is gradually increased when the capacity ratio exceeds 20 times, and becomes constant at about 100 times. When the capacity ratio is about 50 times or more, particularly, a damage is not caused even at a low rotational speed. In this case, the floating distance d is about 3 to 5 $\mu$m. When the capacity of the bearing gap 3 other than the pockets and between the rotor 1 and the housing 2, and the capacities of the pockets 1P and 2P are respectively indicated by $3_v$, $1P_v$, and $2P_v$, therefore, it is preferable to set a ratio $[(1P_v+2P_v)/3_v$ of a total of the capacities of the pockets 1P and 2P and the capacity of the bearing gap 3], to be 50 or more times. In FIG. 1, a step portion 1b of a large diameter is disposed in an upper portion of the pocket 1P. The capacity of the portion is included in $1P_v$ (this is applicable also in the other embodiments described later).

Figure 3:
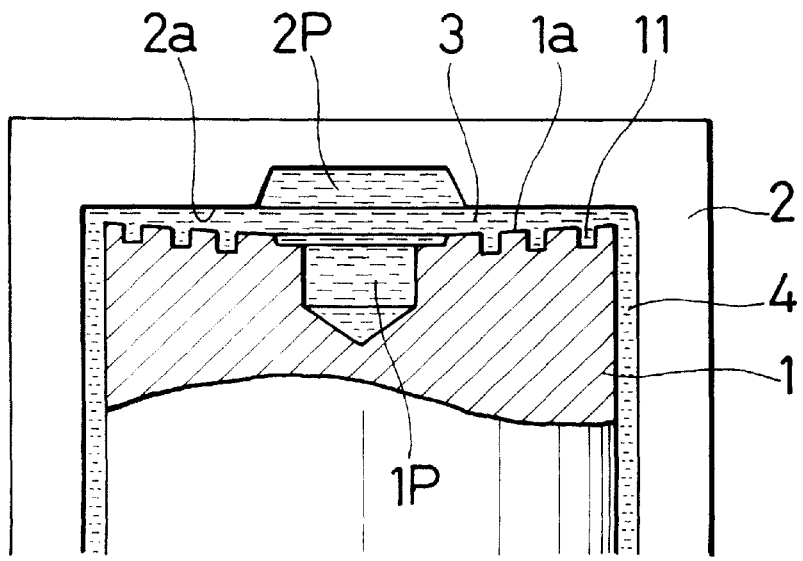
FIG. 3 is a partial section view of a thrust dynamic pressure bearing of a second embodiment of the invention.

FIG. 3 is a partial section view of a thrust dynamic pressure bearing of a second embodiment of the invention. The thrust dynamic pressure bearing also is configured by a rotor 1 and a housing 2. The rotor 1 is accommodated in the housing 2 in a hermetically sealed state with forming small gaps 3 and 4. The gaps 3 and 4 are filled with a working fluid L for generating a dynamic pressure. V-like or herringbone-like thrust dynamic pressure generating grooves 11 are formed in an upper end face 1a of the rotor 1. Pockets 1P and 2P which serve as spaces for accumulating the working fluid L are disposed in the upper end face 1a of the rotor 1 and a face 2a that is opposed to the upper end face 1a, respectively. In this case, the gap 3 between the rotor 1 and the housing 2 is made inclinedly smaller (reduced) as moving toward a radially outer side.

In a hydrodynamic bearing, also at a low rotational speed, negative-pressure suction easily occurs in the bearing gap 3 inside the thrust dynamic pressure generating grooves 11. By contrast, in the embodiment, a large amount of the working fluid exists in a center portion of the bearing gap 3 and the pockets 1P and 2P, and hence the working fluid can easily flows from the center portion toward a radially outer side. In other words, the working fluid is caused to easily flow toward the radially outer side by a centrifugal force, without allowing an interval in which negative-pressure suction can occur to elapse. Therefore, a dynamic pressure is correspondingly easily generated in the thrust dynamic pressure generating grooves 11, so that the flotation force is increased. In the second embodiment also, it is preferable to set a ratio $[(1P_v+2P_v)/3_v]$ of a total of the capacities $1P_v$ and $2P_v$ of the pockets 1P and 2P and the capacity $3_v$ of the bearing gap 3, to be 50 or more times.

Figure 4A:
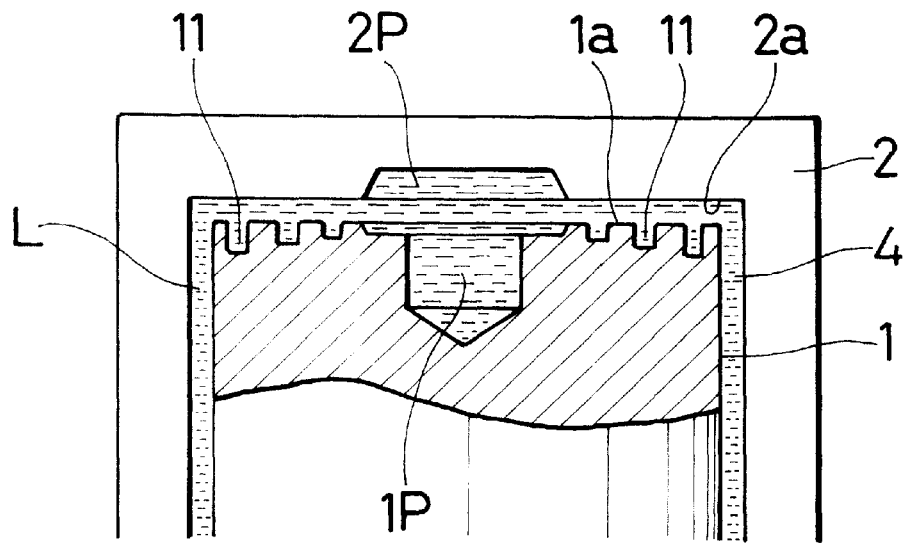
FIG. 4(A) is a partial section view of a thrust dynamic pressure bearing of a third embodiment of the invention.
Figure 4B:
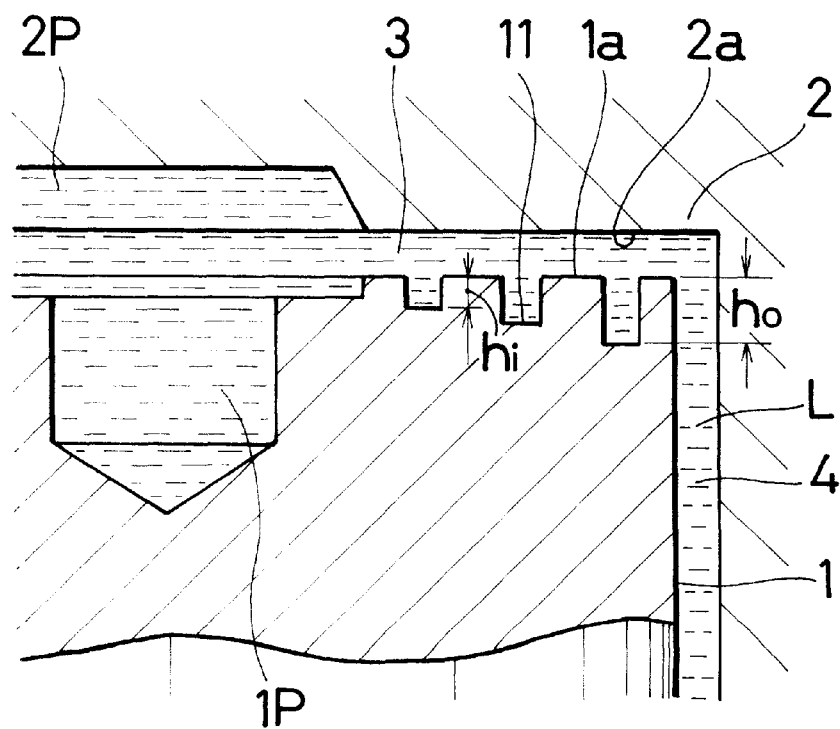
FIG. 4(B) is a partial enlarged view of a dynamic pressure generating portion shown in FIG. 4(A)

FIG. 4(A) is a partial section view of a thrust dynamic pressure bearing of a third embodiment of the invention. The thrust dynamic pressure bearing also is configured by a rotor 1 and a housing 2. The rotor 1 is accommodated in the housing 2 in a hermetically sealed state with forming small gaps 3 and 4. V-like or herringbone-like thrust dynamic pressure generating grooves 11 are formed in an upper end face 1a of the rotor 1. Pockets 1P and 2P which serve as spaces for accumulating the working fluid L are disposed in the upper end face 1a of the rotor 1 and a face 2a that is opposed to the upper end face 1a, respectively. In this case, as shown in a partial enlarged view of FIG. 4(B), the depth h of the thrust dynamic pressure generating grooves 11 which are formed in the surface of the rotor 1 is made larger as moving toward the radially outer side (hi<ho).

Figure 5:
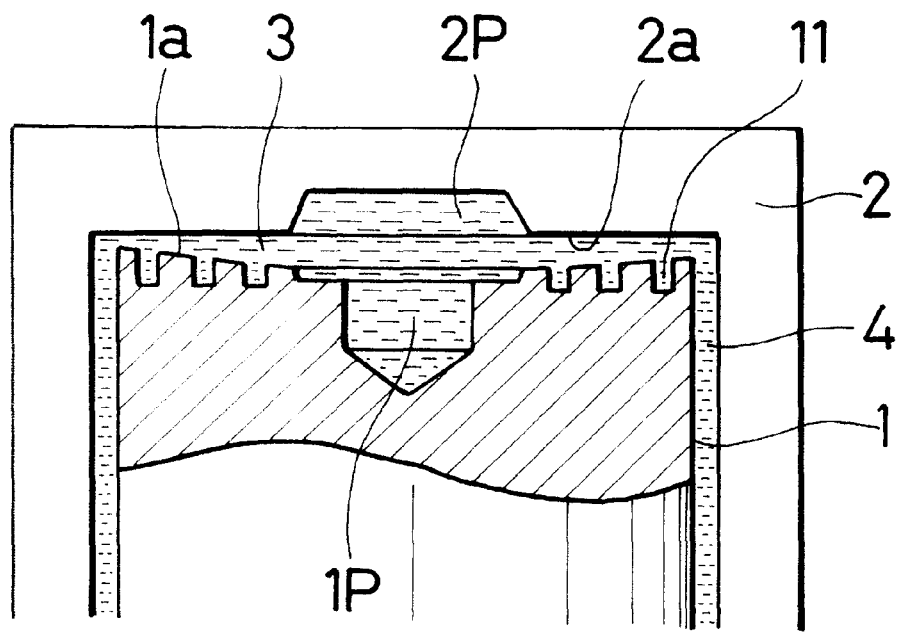
FIG. 5 is a partial section view of the thrust dynamic pressure bearing of the third embodiment of the invention, and showing the case where a bearing gap is made smaller as moving toward a radially outer side.

In a dynamic bearing, negative-pressure suction easily often occurs in an inner side, also at a low rotational speed. By contrast, in the third embodiment, the thrust dynamic pressure generating grooves 11 are deeper as moving toward the radially outer side where the bearing gap 3 is narrower, and hence a larger amount of the working fluid can be ensured in the outer side. The working fluid exists at a larger amount in the inner side of the gap and the pockets 1P and 2P, so that the working fluid can easily flow (can be easily supplied) from the radially inner side toward the radially outer side. Therefore, the working fluid collects to a center portion of the thrust dynamic pressure generating grooves 11, a dynamic pressure is easily generated, and also the flotation force is easily generated. In this case also, it is preferable to set a ratio $[(1P_v+2P_v)/3_v]$ of a total of the capacities of the pockets 1P and 2P and the capacity of the bearing gap 3, to be 50 or more times. As shown in FIG. 5, the bearing gap 3 between the rotor 1 and the housing 2 may be inclinedly reduced as moving toward the radially outer side.

Figure 6:
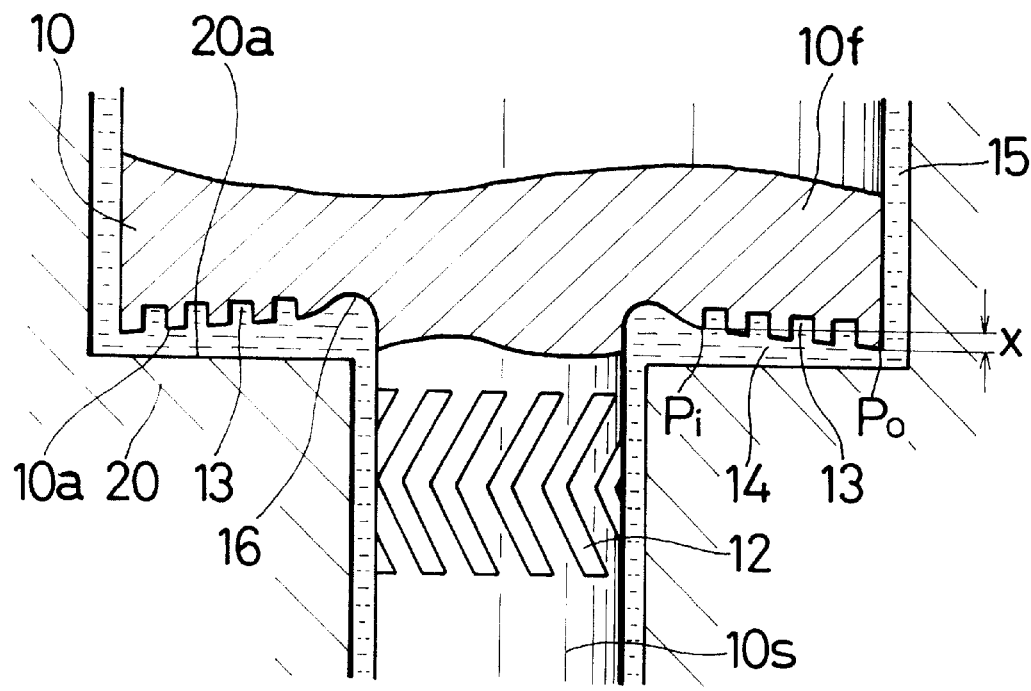
FIG. 6 is a partial section view of a thrust dynamic pressure bearing of a fourth embodiment of the invention.

Next, FIG. 6 is a view showing a fourth embodiment of the invention. A dynamic pressure bearing of the embodiment is configured by: a rotor 10 having a rotation shaft 10s in which radial dynamic pressure generating grooves 12 are disposed, and a flange 10f in which thrust dynamic pressure generating grooves 13 are disposed; a housing 20; and a working fluid L which is filled in gaps 14 and 15 between the housing 20 and the rotor 10. A recess 16 for accumulating the working fluid L is formed in the root portion where the flange 10f is connected to the rotation shaft 10s. The gap 14 between an end face 10a of the flange 10f and a receiving face 20a of the housing 20 is formed to be smaller (narrower) as moving toward a radially outer side. In this case, at start of rotation, negative-pressure suction is greater as moving to the outer side where the gap is narrower, and hence the working fluid easily flows from the recess 16 into the gap, so that a trouble due to an insufficient amount of the working fluid hardly occurs. Preferably, the level difference X of the inclination between the position $P_i$ of the inner side of each of the thrust dynamic pressure generating grooves 13 and the position $P_o$ of the outer side is set to be about 1 to 5 $\mu$m.

Figure 7A:
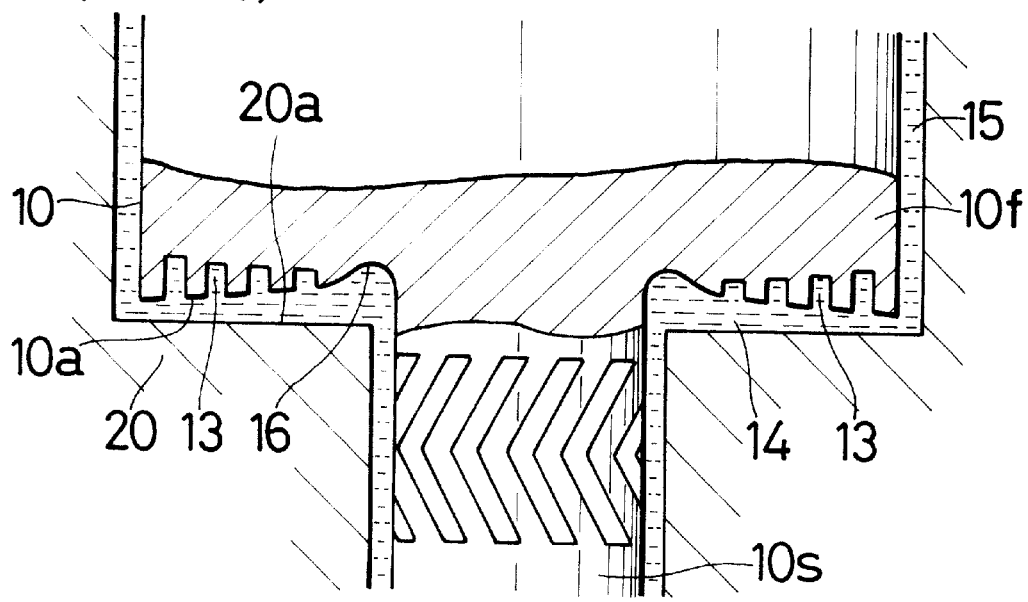
FIG. 7(A) is a view showing a fifth embodiment of the invention.
Figure 7B:
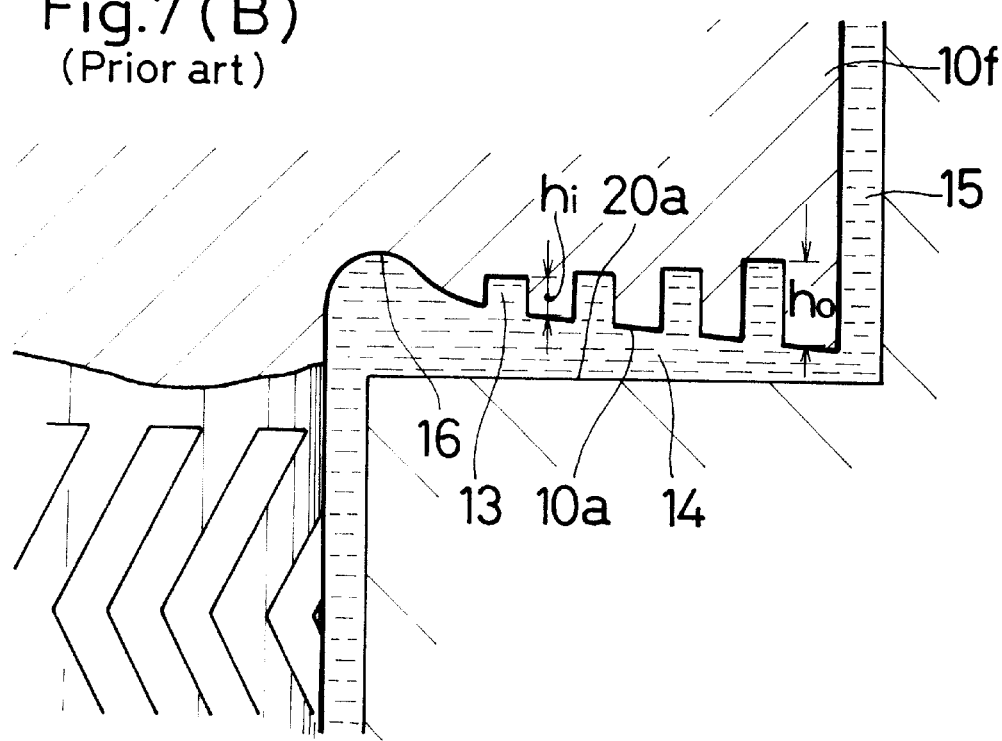
FIG. 7(B) is a partial enlarged view of a dynamic pressure generating portion shown in FIG. 7(A)
Figure 8:
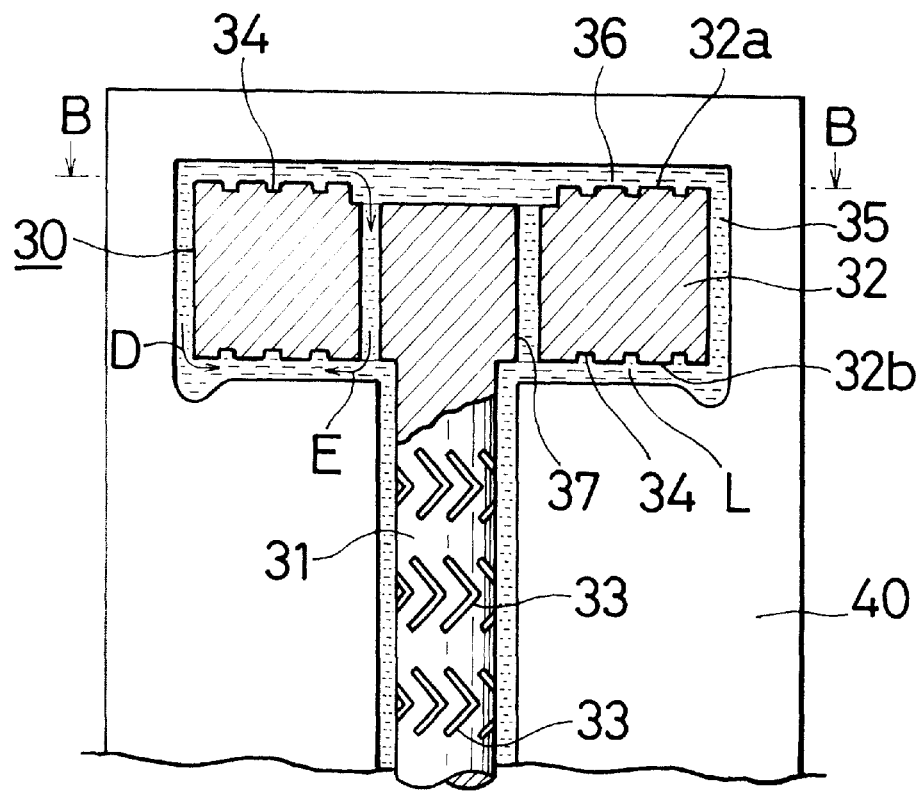
FIG. 8(A) is a partial section view showing an example of a conventional thrust dynamic pressure bearing.
FIG. 8(B) is a section view taken along the line B—B of FIG. 8(A)
Figure 8:
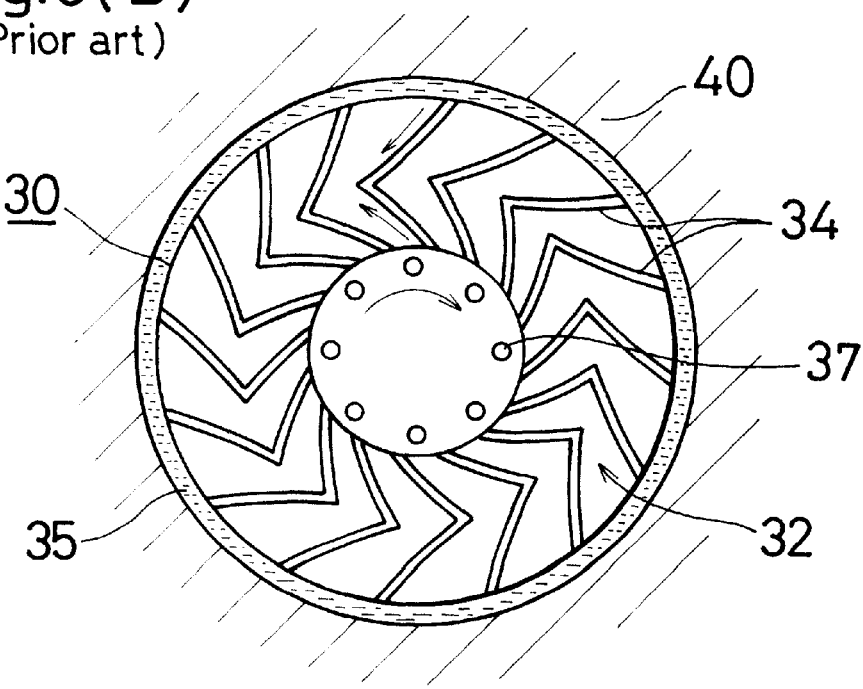

FIG. 7(A) is a view showing a fifth embodiment of the invention. Also a dynamic pressure bearing of the embodiment is configured by: a rotor 10 having a rotation shaft 10s in which radial dynamic pressure generating grooves 12 are disposed, and a flange 10f in which thrust dynamic pressure generating grooves 13 are disposed; a housing 20; and a working fluid L which is filled in gaps 14 and 15 between the rotor 10 and the housing 20. A recess 16 for accumulating the working fluid L is formed in the root portion where the flange 10f is connected to the rotation shaft 10s. The gap 14 between an end face 10a of the flange 10f and a receiving face 20a of the housing 20 is formed to be smaller (narrower) as moving toward a radially outer side. In the embodiment, as shown in FIG. 7(B), the depth h of the thrust dynamic pressure generating grooves 13 is made larger as moving toward the radially outer side (hi<ho). In this case, at start of rotation, negative-pressure suction is greater as moving to the outer side where the gap is narrower. By setting the depth h of the thrust dynamic pressure generating grooves 13 to be larger, the working fluid is ensured in the outer side, and movement of the working fluid to the center portion of the thrust dynamic pressure generating grooves 13 is facilitated, thereby making a dynamic pressure to be easily generated (a flotation force can be easily generated). Furthermore, the working fluid L more easily flows from a radially inner side where the recess 16 is disposed, to a radially outer side, with the result that a trouble such as breakage due to an insufficient amount of the working fluid hardly occurs. Preferably, the difference (ho−hi) between the depth of the thrust dynamic pressure generating grooves 13 in the outer side and that in the inner side is set to be 1 to 5 $\mu$m.

In the embodiments described above, the thrust dynamic pressure generating grooves (11, 13) are disposed in the surface of the rotor 1 or the flange 10f. Alternatively, the grooves may be disposed in the end face or the receiving face of the housing 2 or 20.

As described above in detail, according to the thrust dynamic pressure bearing of the invention, negative-pressure suction at start of rotation can be eliminated without increasing the production cost and the size of the bearing, and without opening small holes which are difficult to be formed. Since a portion where the working fluid becomes insufficient is not produced, a trouble such as breakage can be eliminated, so that the reliability as a dynamic pressure bearing can be ensured for a long term.

What is claimed is:

1. A thrust dynamic pressure bearing, comprising:
   a rotor having a rotor end face, said rotor being formed without through holes passing through said rotor;
   a housing accommodating said rotor in a hermetically sealed state with a housing face opposing said rotor end face and defining a bearing gap therebetween;
   thrust dynamic pressure generating grooves being formed in a v-shape in one of said rotor end face and said housing face, and said bearing gap and said dynamic pressure generating grooves being filled with a working fluid for generating a dynamic pressure; and
   first and second pockets, which serve as spaces for accumulating the working fluid, being formed in said rotor end face and said housing face of said housing that is opposed to said rotor end face, respectively, and a total of capacities of said first and second pockets being 50 times or more a capacity of said bearing gap between said rotor end face and said housing face.

2. A thrust dynamic pressure bearing according to claim 1, wherein said bearing gap between said rotor end face and said housing face is inclinedly reduced as moving toward a radially outer side of said rotor.

3. A thrust dynamic pressure bearing according to claim 1 or 2, wherein a depth of said thrust dynamic pressure generating grooves is inclinedly larger as moving from a radially inner side toward a radially outer side of said rotor.

4. A thrust dynamic pressure bearing comprising:
   a housing;
   a rotor including a rotation shaft in which radial dynamic pressure generating grooves are formed, and a flange formed without through holes and in which thrust dynamic pressure generating grooves are formed in a v-shape in a radial flange surface which opposes a receiving surface of said housing and defines a bearing gap therebetween; and
   said flange defining a recess in a root portion where said flange is connected to said rotation shaft and between said radial flange surface and said rotation shaft, said bearing gap and said recess being hermetically filled with a working fluid, wherein
   said bearing gap between said radial flange surface and said receiving surface is formed to be smaller as moving toward a radially outer side of said rotor.

5. A thrust dynamic pressure bearing according to claim 4, wherein a depth of said thrust dynamic pressure generating grooves is inclinedly larger as moving from a radially inner side toward the radially outer side of said rotor.

6. A thrust dynamic pressure bearing, comprising:

a rotor having a rotor end face, said rotor being formed without through holes passing through said rotor;

a housing accommodating said rotor in a hermetically sealed state with a housing face opposing said rotor end face and defining a bearing gap therebetween;

thrust dynamic pressure generating grooves being formed in a v-shape in one of said rotor end face and said housing face, and said bearing gap and said dynamic pressure generating grooves being filled with a working fluid for generating a dynamic pressure; and said bearing gap between said rotor end face and said housing face being inclinedly reduced as moving toward a radially outer side of said rotor.

\* \* \* \* \*